United States Patent
Luzzatto et al.

(10) Patent No.: US 7,515,103 B2
(45) Date of Patent: Apr. 7, 2009

(54) MEASURING DISTANCE USING WIRELESS COMMUNICATION

(75) Inventors: Ariel Luzzatto, Tel Aviv (IL); Salomon Serfaty, Tel Aviv (IL)

(73) Assignee: Motorola, Inc., Schaumburg, IL (US)

( * ) Notice: Subject to any disclaimer, the term of this patent is extended or adjusted under 35 U.S.C. 154(b) by 89 days.

(21) Appl. No.: 11/359,246

(22) Filed: Feb. 21, 2006

(65) Prior Publication Data

US 2006/0197704 A1  Sep. 7, 2006

Related U.S. Application Data

(63) Continuation of application No. PCT/EP2004/051289, filed on Jun. 29, 2004.

(30) Foreign Application Priority Data

Aug. 21, 2003  (GB)  .................. 0319703.5

(51) Int. Cl.
*G01S 3/02* (2006.01)

(52) U.S. Cl. ...................................... 342/458

(58) Field of Classification Search .................. 342/107, 342/109, 450, 458, 463, 465
See application file for complete search history.

(56) References Cited

U.S. PATENT DOCUMENTS

| 5,687,196 | A | 11/1997 | Proctor, Jr. |
| 6,442,214 | B1 * | 8/2002 | Boleskei et al. ............. 375/299 |
| 6,760,592 | B2 | 7/2004 | Hernandez |
| 2004/0257270 | A1 * | 12/2004 | Poullin ....................... 342/159 |
| 2006/0133549 | A1 * | 6/2006 | Talwar ....................... 375/346 |

* cited by examiner

*Primary Examiner*—Dao L Phan
(74) *Attorney, Agent, or Firm*—Barbara R. Doutre; Anthony P. Curtis

(57) ABSTRACT

A method of estimating the distance between a first wireless communication terminal and a second wireless communication terminal includes: receiving a signal at the first terminal, processing the received signal including performing a demodulation operation to produce a demodulated signal; and resolving the demodulated signal into a plurality of components corresponding to different path length components included in the received signal; identifying which of the resolved components corresponds to a shortest path length; and for the identified component, computing a time of travel from the second terminal to the first terminal.

25 Claims, 1 Drawing Sheet

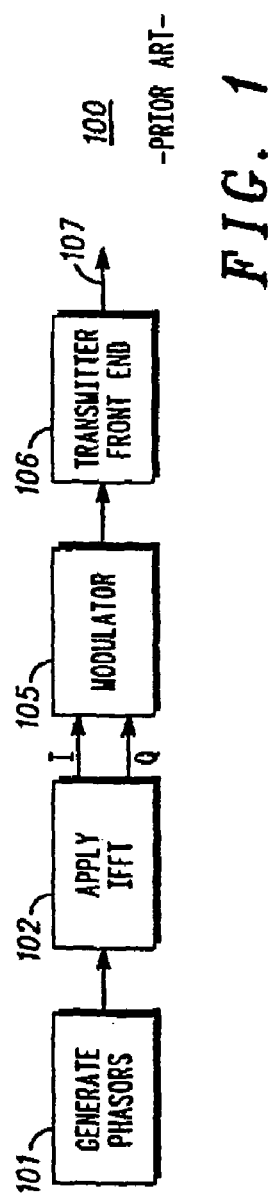
FIG. 1 -PRIOR ART-
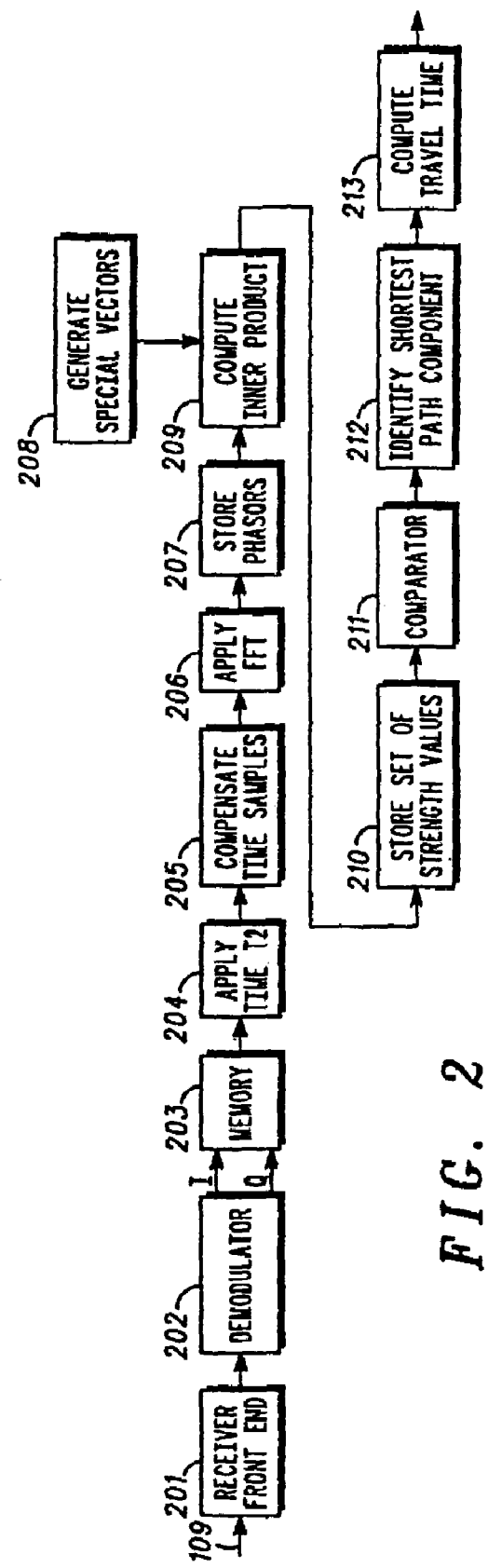
FIG. 2

MEASURING DISTANCE USING WIRELESS COMMUNICATION

This application is a continuation under 35 U.S.C. 517 120 of international application PCT/EP2004/051289, "Measuring Distance Using Wireless Communication," filed on Jun. 29, 2004, which claims the benefit of priority to GB application GB0319703.5, entitled "Measuring Distance Using Wireless Communication," filed on Aug. 21, 2003.

FIELD OF THE INVENTION

The present invention relates to measuring distance using wireless communication. In particular, it relates to measuring the distance between two terminals operating in a system using orthogonal frequency division multiplexing (OFDM), e.g. in a local area network (LAN).

BACKGROUND OF THE INVENTION

Orthogonal Frequency Division Multiplexing (OFDM) is a known type of radio frequency (RF) modulation specified for use in local area networks (LANs) such as those operating in accordance with the 802.11a LAN industry standard in the 5 GHz frequency band. This band is a non-coordinated, license-free band allocated for high-speed (up to 56 Mb per sec) data transfer.

There is a derivative of the protocol defined in the 802.11a LAN standard which is being proposed for use in the 4.9 GHz band, intended for public safety use only. Its operation and modulation is very similar to that specified for the 802.11a LAN standard, with some added capabilities.

Generally, the LANs being developed in accordance with the 802.11a LAN standard comprise Remote Units (RUs) and one or more Access Points (APs). An AP and a RU may in practice be communication terminals formed of similar hardware, including a 4.9-5.0 GHz transceiver with a powerful signal processing capability. The RU may in practice be a mobile terminal. The AP may in practice be a fixed terminal physically connected to a static physical network, and communicated data may be transferred to and from the network by the AP.

It is desirable for the distance of a RU to an AP to be known to the AP. A known system for measuring the location of a RU relative to an AP in the 2.4 GHz band, using Bluetooth Frequency Hopping (FH) modulation, includes a transponder at the RU. The transponder includes a dedicated chip. This system requires special hardware and software additions at each RU thus making the RU a non-standard product. Moreover, distance measuring with FH modulation requires the use of a loop-back procedure. FH modulation is basically different to and incompatible with OFDM modulation.

SUMMARY OF THE INVENTION

In accordance with a first aspect of the present invention, there is provided a method of estimating the distance between a first wireless communication terminal and a second wireless communication terminal including:
(i) receiving at the first terminal a received signal comprising a composite multipath derivative of a RF transmission signal transmitted by a second terminal which transmission signal comprises an OFDM signal; and
(ii) processing the received signal including performing a demodulation operation to produce a demodulated signal;

and characterised by:
(iii) resolving the demodulated signal into a plurality of components corresponding to different path length components included in the received signal;
(iv) identifying which of the resolved components corresponds to a shortest path length; and
(v) for the identified component, computing a time of travel from the second terminal to the first terminal.

In accordance with a second aspect of the present invention, there is provided a first wireless communication terminal operable to measure the distance between itself and second wireless communication terminal, the first terminal including:
(i) a receiver for receiving a received signal comprising a composite multipath derivative of a RF transmission signal transmitted by a second terminal which transmission signal comprises an OFDM signal; and
(ii) a demodulator for performing a demodulation operation on the received signal to produce a demodulated signal;

and characterised by (iii) one or more processing functions operable to:
(a) resolve the demodulated signal into a plurality of components corresponding to different path length components included in the received signal;
(b) identify which of the resolved components corresponds to a shortest path length; and
(c) for the identified component, computing a time of travel from the second terminal to the first terminal.

The method and the first terminal may thus use a one-way communication path (transmitting terminal to receiving terminal without loopback) only using standard OFDM signalling. "Standard" OFDM signaling means that the existing (now or in the future) communication protocol/physical layer can be used without modification and with an existing RU product.

The second terminal may conveniently consist of standard unmodified hardware and software (i.e. the second terminal does not need to be modified to allow use in connection with the first terminal according to the invention.

In the first and second aspects, the first terminal may be operable to determine a strength value for each of the resolved components. The strength value may be compared with a threshold value to determine if the strength value is to be considered as non-zero, whereby the component having that strength value is to be included to find the component having the shortest path length.

The transmitted signal which is transmitted by the second terminal and received by the first terminal in the first and second aspects of the invention may conveniently be the PLCP (Physical Layer Convergence Procedure) Training Signal defined in the 802.11 standard. This is the 'Long Training Sequence' normally provided at the beginning of a transmission by a terminal (e.g. a RU). The purpose of this signal is to allow another terminal (e.g. an AP) to synchronize with the terminal.

The Training Signal includes a training symbol which is a standard symbol defined by the 802.11a LAN standard. It may be represented either in the frequency domain or in the time domain. In the frequency domain, the training symbol consists of 64 predefined complex numbers, also known as phasors, where 52 of the complex numbers are non-zero and the others are zero. In the time domain, the training symbol consists of 64 time samples of a complex time signal obtained by computing the inverse fast fourier transform (FFT) of the phasors. Each sample of the complex time signal is made up of two independent components, namely an I (in-phase) component and a Q (quadrature) component. The I component is the real part of the complex sample and the Q component is the imaginary part of the complex sample. The I and Q components may be combined by the known process of Quadrature Amplitude Modulation (QAM) to produce the transmitted RF signal. The training symbol is sent twice by a transmitter at start times referred to herein as T1 and T2. These times are recorded for synchronization purposes in a receiver in a known manner.

In the first and second aspects of the invention, the transmission signal may thus comprise a training symbol produced by applying an inverse FFT operation to phasors of a generated signal in the frequency domain to generate I and Q components which are combined to produce the transmission signal.

The first terminal conveniently includes a memory to store information produced as an output by the demodulator. Where the transmission signal has been produced by applying an inverse FFT operation, the information stored by the memory comprises complex time samples of the signal demodulated by the demodulator. The first terminal may further include a processing function which is operable to locate a time corresponding to a start of the training symbol to define a sampling start time for the stored time samples. Preferably, the processing function is operable to locate the time T2 referred to earlier.

The first terminal may further include a processing function operable to apply a correction factor to the time samples to compensate for frequency offset. The first terminal may perform a FFT operation on the time samples, e.g. after compensation for frequency offset. The FFT operation may be a discrete fourier transform (DFT) operation. A recovered composite vector C of phasors (which consists of the superposition of the effect of all of the multipath signals received) is produced by the FFT operation. The first terminal may further include a processing function which constructs a special set $\{Ck\}$ of vectors explained further below, wherein each component of the set corresponds to a different particular path length traveled by the transmission signal. The first terminal may further include a processing function which resolves the recovered composite vector of phasors signals received into components corresponding to different path lengths. This is achieved by carrying out a mathematical functional operation to find the absolute value of the inner product $|<C,Ck>|$ of the composite vector C with each of the component values of the special vector set $\{Ck\}$. This operation takes advantage of the unique combination of received phases corresponding to each path length, and of the orthogonality properties of the set $\{Ck\}$ of special vectors constructed.

Any one or more of the processing operations on the information recovered from the demodulated received signal may be carried out by a single processor or multiple processors operating in combination. In practice, each such processor may be a digital signal processor (microprocessor) which may be implemented in any of the hardware and/or software forms known per se in the art.

Examples of detailed operational methods (algorithms) for use in the first terminal to carry out the processing functions described above will be described later.

In this specification, 'RF' is generally understood to mean frequencies of greater than 10 KHz, e.g. up to 500 GHz. In many cases the RF energy will have a frequency of from 100 KHz to 100 GHz. Although the invention could in principle be applied at frequencies throughout this range, it is particularly suited for use at frequencies in the range 1 GHz to 10 GHz, especially wireless LAN frequencies in the region of 4.9-5.0 GHz.

In accordance with a third aspect of the present invention, there is provided a method of estimating the distance between the first wireless communication terminal defined earlier and a second wireless communication terminal including:

at the second (transmitting) terminal:
(i) generating an OFDM training symbol comprising phasors in the FFT domain;
(ii) processing the generated signal by applying an inverse FFT operation to the phasors of the generated signal in the frequency domain to generate I and Q components;
(iii) combining the I and Q components to produce a transmission signal; and
(iv) transmitting the transmission signal;

and at the first (receiving) terminal:
(v) receiving at the first terminal a received signal comprising a composite multipath derivative of the RF transmission signal transmitted by the second terminal which transmission signal comprises an OFDM signal; and
(vi) processing the received signal including performing a demodulation operation to produce a demodulated signal;

and characterised by:
(vii) resolving the demodulated signal into a plurality of components corresponding to different path length components included in the received signal;
(viii) identifying which one of the resolved components corresponds to a shortest path length; and
(ix) for the identified component, computing a time of travel from the second terminal to the first terminal.

The method may include for each of the resolved components the steps of determining a strength value and comparing the strength value with a threshold value to determine if the strength value is non-zero. The step of identifying which one of the resolved components has the shortest path length may be applied only to the components having strength values determined to be non-zero.

The first terminal may comprise an Access Point terminal and the second terminal may comprise a Remote Unit terminal, both of a LAN, e.g. operating in accordance with the 802.11 standard or other LAN protocol. The distance between the two terminals, computed in accordance with an embodiment of the invention, may be used by the first terminal in various ways. These include:

1) Assisted Handoff: Since the RF strength received by an Access Point from a Remote Unit in an LAN is not necessarily in a simple relationship with the distance between the two, it is beneficial, when the communication link quality becomes marginal, for the Access Point to direct the Remote Unit to switch its connection to the closest Access Point, rather than the Access Point from which the strongest signal is received. This enables the time between handoffs to be maximised, and the signal processing burden on the central switch of the LAN to be minimised. The distance value determined by each AP is communicated to each RU within communication range to allow the RU to find the closest AP.

2) Location: There is a need to know the current position of personnel or vehicles, e.g. of public safety personnel, such as members of police services. Using an embodiment of the invention in such an application, when the distance between a RU and a plurality of APs is known, and the positions of the fixed APs is known, the position of the RU can be calculated by triangulation. The distance information may be used to find the position of the RU in this way by a computation in a processor at the RU. The computation could alternatively be carried out at a processor at one of the APs or elsewhere. In all cases, the measured distance information has to be communicated from the relevant APs to the terminal which includes the processor which is to carry of the computation.

Use of a suitable algorithm embodying the invention to compute the distance between two terminals beneficially avoids the need for any transponder or other special hardware or software at the second (transmitting) terminal. The distance measurement may be performed by simply analysing at the first terminal a standard training transmission of the second terminal. Therefore, this embodiment provides a single path, not a loop-back, procedure. Thus standard equipment and operational software may beneficially be used for the first terminal.

Embodiments of the present invention will now be described by way of example only, with reference to the accompanying drawings, in which:

BRIEF DESCRIPTION OF THE ACCOMPANYING DRAWINGS

FIG. 1 is a functional block diagram of a known OFDM transmitter.

FIG. 2 is a functional block diagram of an OFDM receiver and processor embodying the present invention.

DESCRIPTION OF EMBODIMENTS OF THE INVENTION

OFDM, as used in embodiments of the invention, is a known modulation form that subdivides the communication channel into N sub-channels. These sub-channels are centred around sub-carriers. Data is transmitted in OFDM by modulating all sub-carriers using modulations such as 4QAM, 16QAM and 64QAM (where 'QAM' is Quadrature Amplitude Modulation). All sub-carriers are transmitted simultaneously Prior to any data transmission in an OFDM LAN system in accordance with the 802.11 standard, a training sequence is sent by the transmitter to properly synchronize the receiver in time and in frequency. At the beginning of a transmission, the RU transmits an OFDM RF burst known as the 'Long Training Sequence', whose purpose is to allow the AP to synchronize. The Long Training Sequence consists of N sub-carriers in the frequency domain (N=52 in 802.11a) equally spaced in frequency in the vicinity of the carrier (around 5 GHz). Each sub-carrier has the same amplitude but a different predetermined phase. The phase values are fixed and known, and are set to provide specific useful properties to the composite signal. Moreover, all of the sub-carriers are generated by the same system and are locked to the same synthesizer, thus are all phase-related in a deterministic way.

By the laws of wave propagation, each sub-carrier reaching a remote location at a distance L, will experience a different phase change (owing to its different frequency). Some of the sub-carriers will experience multiple 360 degrees phase rotations. However, the combination of the N phases seen at the remote location is unique, and is uniquely related to the distance L travelled and to the initial phases of the Long Training Symbol.

If the received signal is the composite superposition of many signals, each one having travelled a (slightly) different distance due to multiple reflections (multipath propagation), the received signal contains information related to all of these paths.

In practice, the phases, amplitudes and frequency separation of the sub-carriers (at the transmitting RU) are fixed and known, and are set according to the standard training symbol. By application of an inverse FFT operation, these phases and amplitudes generate a time varying signal which is transmitted as an over the air RF signal. The received signal is a time varying signal which is a derivative of the transmitted signal affected by the propagation conditions, the multipath reflections and noise.

An FFT operation is performed on this received time signal to provide a set of complex vectors which are related to the original training symbol, but distorted by the multipath effect and by the changes of phase due to the law of propagation, and each one of these vectors contains mixed information about all of the signal components together included in the multipath received signal. By using a discrete multipath model of the channel, and by processing the complex vector, we are able to separate the information relating to the individual paths, so that the shortest path can be identified. The other longer paths can be considered due to reflections of the originally transmitted signal. This is done in the following way.

By taking advantage of orthogonality properties of the OFDM modulation, we can construct a set of special vectors, each one related to one specific possible travelling distance included in all of the possible paths covered by the multiple components of the multipath received signal. We perform a mathematical vector operation to find the so-called inner product of the complex vectors (reconstructed from the received time signal by FFT) and each one of the special vectors we have constructed. In this way, we are able produce a set of different values each corresponding to one of the different possible paths. Each such value is proportional to the energy received from each different path, in other words the corresponding strength of each component of the multipath received signal.

The shortest path length associated with a non-zero strength value included in the computed set of strength values, is the direct distance between the transmitting RU and the receiving AP. It should be noted that this path may have a strength value smaller than those computed for one or more longer paths owing to different propagation conditions in different paths. The strength values obtained in the computed set may be compared with a threshold value to determine whether they are non-zero, i.e. if they are equal to or greater than the threshold. The threshold strength value may for example be one half of the maximal value detected over all of the paths.

FIG. 1 illustrates production and transmission of an OFDM signal in a transmitter of known form in a RU in a 802.11 LAN. A set of phasors is generated by a baseband generator 101. These represent training signal information in the frequency domain. An inverse FFT operation is applied to the phasors by an operator 102. The result is 64 complex time samples each having an I component and a Q component. These components are provided to a modulator 105 which produces by quadrature amplitude modulation (64QAM) a RF signal to be transmitted. This signal is processed and transmitted at RF as a transmitted signal 107 by a transmitter front end 106.

FIG. 2 illustrates reception and processing of a signal in a receiver/processor 200 of an AP. A received signal 109 is received at a receiver front end 201. The received signal 109 is a multipath derivative version of the transmitted signal 107 produced by the transmitter 100 of FIG. 1. The output of the receiver front end 201 is processed by a demodulator 202 which carries out the inverse of the function of the modulator 105 of the transmitter 105 (FIG. 1) to produce complex time samples having I and Q components which are stored in a memory 203. From the synchronisation information separately acquired in a known manner by the receiver 200, a time T2 corresponding to the start of a second transmission of a training symbol by the transmitter 100 is identified. In a processor 204, the time T2 is located within the samples stored in the memory 203 to provide a time reference, i.e. a precise sampling start time. In a processor 205, the time samples adjusted to the time T2 reference are further processed by applying in a compensator 205 a correction factor to take account of frequency offset (explained further later). A FFT operation is then applied to the corrected time samples by an operator 206 to produce a complex vector C consisting of a set of phasors. These are the phasors of the original training symbol which are corrupted as a result of the multipath reflections of the transmitted signal 107. These phasors are stored in a store 207.

A generator 208 generates a set $\{C_k\}$ of special vectors which are related to the possible individual path lengths covered by the components within the multipath received signal information in the complex vector C. In practice, if the long training symbol is fixed, the vectors $\{C_k\}$ can be generated once and stored in a memory. A processor 209 resolves the recovered complex vector C of the phasors in the store 207 into components corresponding to different path lengths by computing the function known as the inner product absolute value of the complex vector C with each of the components of the set $\{C_k\}$. It is possible to resolve the complex vector C into the required components in this way owing to the unique combination of received phases corresponding to each path length component included in the multipath information of the complex vector C, as well as the orthogonality properties of the set $\{C_k\}$. The resulting values produced by this computation are a set of strength values which are stored in a store 210. Each of the strength values of the set produced and stored corresponds to a received signal component, resolved from the multipath signal, which has travelled a different distance. These values are applied to a comparator 211 which compares each value with a threshold strength value. As noted earlier, the threshold value may be one half of the maximal strength value for the complete set of values. Each strength value which is not less the threshold is applied as a non-zero value to a detector 212 which identifies which one of the non-zero values applied corresponds to the shortest path length travelled. Finally, the time of travel from the transmitter 100 to the receiver/processor 200, which is a measure of the distance of travel, of the signal component providing the identified value is computed from the related information about that component.

In practice, as will be apparent to those skilled in the art, two or more of the various processing functions applied to the decoded signal as described with reference to FIG. 2 may be conveniently be carried out by a common processing device such as a digital signal processor (microprocessor chip).

A detailed analysis of operation of the processing functions within the receiver/processor 200 is as follows.

1. Description of an Algorithm

The non-zero baseband subcarriers $S_n(t)$ of the OFDM long training symbol have the form $$S_n(t) = \rho_n e^{i(n\Delta\omega \cdot t + \phi_n)}, \rho_n = 1, \phi_n \in \{0, \pi\}, n = -N_c/2, \ldots, N_c/2, n \neq 0. \quad (1)$$

where for a 802.11a OFDM long training symbol $N_c=52$, $N=64$, $\Delta\omega=2\pi \cdot 20E6/N$, where N is the number of time samples in one symbol. Denote by $\omega_t$, $\omega_r$ the modulator and demodulator center frequencies with random phases $\theta_t$, $\theta_r$ respectively. Using a discrete multipath model, denote the path coefficients and delays respectively by $$h_m \in C, \tau_m \in R, m=0, \ldots, N_p-1, \quad (2)$$

where $N_p$ is the number of RF paths, and we assume, without loss of generality, that the transmitter (Tx) and receiver (Rx) front-end delay is negligible (if not, this will be a hardware-generated, known, fixed delay which can be corrected by backward-adjusting the phases of the received training symbol accordingly) Then, with $$\varepsilon = \frac{(\omega_t - \omega_r) 2\pi}{N \Delta\omega}, |\varepsilon| << 1, \quad (3)$$

we show in the section entitled 'Limitations and accuracy of the algorithm' section later that the phasor of the n-th received subcarrier, obtained by computing the FFT of the time symbol, has the form $$c_n = \sum_{m=0}^{N_p-1} h_m e^{i\lceil\theta_t-\theta_r-\phi_n-(\omega_t+\pi\Delta\omega)\cdot\tau_m\rceil} + O(\varepsilon) \approx \sum_{m=0}^{N_p-1} b_m e^{i(\phi_n - n\Delta\omega \cdot \tau_m)} \quad (4)$$

Let us neglect the $O(\varepsilon)$ error in (4) for the moment, thus $b_m = h_m e^{(\theta_t - \theta_r - \omega_t \tau_m)}$. Note that (4) is valid for the delayed paths because, with cyclic extension, we always compute the FFT on a full set of N samples for each received path, and $$FFT\{x_{n+d}\} = e^{i\frac{2\pi k}{N}d} FFT\{x_n\}. \quad (5)$$

Thus all we need is the 'Frame Sync' (this is the time signal consisting of 64 time samples which is defined by the 802.11 standard, and is used for time synchronisation of the time samples). Now, we assume that $\{\Phi_n\}$ are known, as they are the phases of the OFDM long training symbol. Represent the $(N_c+1)$—dimensional vector of the demodulated phasors of the long training symbol as $$C = \{c_n(1 - \delta_{n,0})\}, n = -\frac{N_c}{2}, \ldots, \frac{N_c}{2} \quad (6)$$

and consider the vectors $$C_m = \{e^{i(\phi_n - n\Delta\omega \cdot \tau_m)}(1 - \delta_{n,0})\}, \quad (7)$$
$$n = -\frac{N_c}{2}, \ldots, \frac{N_c}{2},$$
$$m = 0, \ldots, N_p - 1$$

then, clearly $$C \in \text{span}\{C_m\}_{m=0}^{N_p-1} \quad (8)$$

and in particular $$C = \sum_{m=0}^{N_p-1} b_m C_m. \qquad (9)$$

If we set $$\tau_m = \frac{2\pi m}{N_p \Delta \omega}, N_p = \frac{N_c}{2}, \qquad (10)$$

then, with the inner product definition $$<x, y> = \sum_{n=-N_p}^{N_p} x_n y_n^* \qquad (11)$$

the vectors $\{C_m\}_{m=0}^{N_p-1}$ are mutually orthogonal, since for $p, q \in 0, \ldots, N_p-1$ $$\begin{aligned} <C_p, C_q> &= \sum_{\substack{n=-N_p \\ n \neq 0}}^{N_p} e^{in\Delta\omega(\tau_q - \tau_p)} \\ &= 2\text{Re}\left\{ e^{i\frac{2\pi}{N_p}(q-p)} \sum_{n=0}^{N_p-1} e^{i\frac{2\pi n}{N_p}(q-p)} \right\} \\ &= N_c \delta_{pq} \end{aligned} \qquad (12)$$

Now if the J-th path is the shortest non-ambiguous one, namely $b_m = 0$, $m < J$, then $$<C, C_k> = \sum_{m=J}^{N_p-1} b_m <C_m C_k> = \begin{cases} 0, k > J \\ N_c b_k, k \geq J \end{cases} \qquad (13)$$

Since $|<C, C_k>|$ is non-vanishing for the first time for k=J, then $$\tau_J = \frac{2\pi J}{N_p \Delta \omega}$$

is the shortest travelling time. If c=3E8m/sec is the speed of light, then the estimated distance is $d = c \cdot \tau_J$ metres.

2. Limitations and Accuracy of the Algorithm

First, let us estimate the error introduced by imperfect frequency synchronization: the down-mixed received time signal for the m-th path and n-th sub-carrier has the form $$S_{n,m}(t) = \{h_m e^{i[(\omega_t + n\Delta\omega)\cdot(t-\tau_m) + \theta_t + \phi_m]}\} e^{-i(\omega_r t + \theta_r)} \qquad (14)$$

which leads to $$S_{n,m}(t) = h_m e^{i[\theta_t - \theta_r + \phi_n - (\omega_t + n\Delta\omega)\cdot \tau_m]} e^{i(\omega_t - \omega_r + n\Delta\omega)\cdot t} \qquad (14)$$

therefore, setting $$\chi_{n,m} = h_m e^{i[\theta_t - \theta_r + \phi_n - (\omega_t + n\Delta\omega)\cdot \tau_m]}, \qquad (15)$$

and with $\epsilon$ as in (3), the corresponding set of signal samples taken at the receiver end at times $$t_q = \frac{2\pi q}{N \Delta \omega}, q = 0, \ldots, N-1 \qquad (16)$$

is $$\begin{aligned} S_{n,m} &= \chi_{n,m} \left\{ e^{i(\omega_t - \omega_r + n\Delta\omega)\frac{2\pi q}{N\Delta\omega}} \right\}_{q=0}^{N-1} \\ &= \chi_{n,m} \left\{ (1 + i\varepsilon q) e^{i\frac{2\pi nq}{N}} + O(\varepsilon^2) \right\}_{q=0}^{N-1} \end{aligned}$$

Thus, from (15) we obtain $$S_{n,m} = h_m e^{i[\theta_t - \theta_r - \phi_n - (\omega_t + n\Delta\omega)\cdot \tau_m]} \left\{ e^{i\frac{2\pi q}{N}} + O(\varepsilon) \right\}_{q=0}^{N-1} \qquad (17)$$

Taking the FFT of (17), and adding up the RF paths leads to (4). With a frequency error as large as 10 ppm, we obtain $|\epsilon| \approx 0016$, thus our assumption in (3) is justified. Slight errors in the (synchronisation with) the Frame Sync signal are not very critical, since a one sample shift results in only 15 error.

The maximal range and resolution are as follows:

$$\frac{\Delta \omega}{2\pi} = 0.3125 \text{ Mhz,}$$

yielding $$\text{max. range} = \frac{2\pi(N_p - 1)}{N_p \Delta \omega} c = 923 \text{ m,}$$

$$\text{resolution} = \frac{2\pi}{N_p \Delta \omega} c \simeq 37 \text{ m.}$$

In the LAN systems being proposed for use at 4.9 GHz, with variable bandwidth, the expected maximal useful range can extend up to 4 km using 5 MHz BW. However, since the range/resolution ratio is constant for a fixed number of sub-carriers, the distance resolution will be about 160 m.

Since the value of $N_p$ is not a power of 2, (12) cannot be computed at once using FFT. Also, the computation must be carried on for all the paths, since a proper decision making regarding the shortest path (which may not be the strongest), requires normalization. However, use of DFT is possible, since $N_p$=26, and real-time computation is not essential.

3. Preferred Form of Use of the Algorithm

The following describes a preferred form of the algorithm when a full 802.11a standard receiver is available. The applicable document we refer to is the standard "IEEE Std 802.11a-1999 Part 11: Wireless LAN Medium Access Control (MAC) and Physical Layer (PHY) specifications" keeping the original notation.

Referring to the previous notation and equations, set $$N_c = 52, \frac{\Delta \omega}{2\pi} = 0.3125 \text{ Mhz}, N_p = \frac{N_c}{2}, \qquad (18)$$

$$\tau_m = \frac{2\pi m}{N_p \Delta \omega}, m = 0, \ldots, N_p - 1$$

The OFDM long training symbol has $N_c+1$ sub-carriers whose phasors are defined by the vector $$L_{-26,26}=[1\ 1\ -1\ -1\ 1\ 1\ -1\ 1\ -1\ 1\ 1\ 1\ 1\ 1\ 1\ -1\ -1\ 1\ 1\\ -1\ 1\ -1\ 1\ 1\ 1\ 1\ 0\ 1\ -1\ -1\ 1\ 1\ -1\ 1\ -1\ 1\ -1\ -1\ -1\ -1\\ -1\ -1\ 1\ 1\ 1\ -1\ -1\ 1\ 1\ -1\ 1\ -1\ 1\ 1\ 1\ 1\ ]\quad(19)$$

where in (19), a "1" or a "−1" correspond respectively to $\phi_n=0$ or $\phi_n=\pi$ in (7). Then, based on (18) and (19) build the vectors $\{C_m\}$ as defined in (7). The PLCP preamble ('SYNC') in the 802.11a PHY, comprises two identical long training sequences at start times denoted by $T_1$ and $T_2$. To maximize the allowed delay spread (or in other words maximize the length of the cyclic extension at the left side) choose to synchronize to the beginning of the time $T_2$.

The following are the steps operated in the AP receiver in the preferred form of operation of the algorithm:
1) store the received samples of the PLCP;
2) make use of the 'Frame Sync' (received separately) provided by the receiver to locate the beginning of $T_2$ in off-line mode;
3) use the channel fine frequency estimation to compensate the time samples for the frequency offset;
4) compute C in (6) with the help of the FFT of the time samples;
5) compute $|<C,C_k>|$ in (13). The smallest J satisfying $$\frac{|<C,C_J>|}{\max_k\{|<C,C_k>|\}}>0.5 \quad(20)$$

is the index corresponding to the shortest path;
6) compute the path length $d=c\cdot\tau_J$, where c is the speed of light.

The invention claimed is:

1. A method of estimating the distance between a first wireless communication terminal and a second wireless communication terminal including:
   (i) receiving at the first terminal a received signal comprising a composite multipath derivative of a RF transmission signal transmitted by a second terminal which transmission signal comprises an OFDM signal; and
   (ii) processing the received signal including performing a demodulation operation to produce a demodulated signal;
   (iii) resolving the demodulated signal into a plurality of components corresponding to different path length components included in the received signal by producing a composite vector C of phasors from the demodulated signal, constructing a special set {Ck} of vectors, wherein each component of the set {Ck} corresponds to a different particular path length travelled by the received signal, and carrying out a mathematical functional operation to find the absolute value of the inner product $|<C,Ck>|$ of the composite vector C with each of the components of the constructed set {Ck};
   (iv) identifying which of the resolved components corresponds to a shortest path length; and
   (v) for the identified component, computing a time of travel from the second terminal to the first terminal.

2. A method according to claim 1 including determining by the first terminal a strength value for each of the components resolved in step (iii).

3. A method according to claim 2 wherein the strength value is compared with a threshold value to determine if the strength value is to be considered as non-zero, and in step (iv) only components having non-zero strength values are included to find the component having the shortest path length.

4. A method according to claim 3 wherein the signal received and processed by the first terminal is a multipath derivative of the PLCP (Physical Layer Convergence Procedure) Training Signal defined in the 802.11 standard.

5. A method according to claim 4 wherein information produced as an output by the demodulation operation in step (ii) is stored in a memory.

6. A method according to claim 5 wherein the information stored in the memory comprises time samples and the method includes applying to the information a processing function to locate a time corresponding to a start of a training symbol within the stored time samples.

7. A method according to claim 6 wherein the processing function is operable to locate within the stored time samples a time T2 corresponding to the start of a second transmission of a training symbol.

8. A method according to claim 7 including applying by the first terminal a correction factor to the stored time samples to compensate for frequency offset.

9. A method according to claim 8 including performing a fast fourier transform (FFT) operation on the time samples to produce the composite vector C of phasors.

10. A first wireless communication terminal operable to measure the distance between itself and second wireless communication terminal, the first terminal including:
   (i) a receiver for receiving a received signal comprising a composite multipath derivative of a RF transmission signal transmitted by a second terminal which transmission signal comprises an OFDM signal; and
   (ii) a demodulator for performing a demodulation operation on the received signal to produce a demodulated signal; and
   iii) one or more processors operable to:
       (a) resolve the demodulated signal into a plurality of components corresponding to different path length components included in the received signal by producing a composite vector C of phasors from the demodulated signal, constructing a special set {Ck} of vectors, wherein each component of the set {Ck} corresponds to a different particular path length travelled by the received signal, and carrying out a mathematical functional operation to find the absolute value of the inner product $|<C,Ck>|$ of the composite vector C with each of the components of the constructed set {Ck};
       (b) identify which of the resolved components corresponds to a shortest path length; and
       (c) for the identified component, compute a time of travel from the second terminal to the first terminal.

11. A terminal according to claim 10 which is operable to determine a strength value for each of the resolved components.

12. A terminal according to claim 11 which is operable to compare the strength value for each of the resolved components with a threshold value to determine if the strength value is to be considered as non-zero, whereby the component having that strength value is to be included to find the component having the shortest path length.

13. A terminal according to claim 12, wherein the first terminal is operable to receive and process as the received signal a multipath derivative of the PLCP (Physical Layer Convergence Procedure) Training Signal defined in the 802.11 standard.

14. A terminal according to claim 13, including a memory to store information produced as an output by the demodulator.

15. A terminal according to claim 14, wherein the memory is operable to store complex time samples of the signal demodulated by the demodulator.

16. A terminal according to claim 15 wherein the first terminal further includes a processing function which is operable to locate a time corresponding to a start of a training symbol within the stored time samples.

17. A terminal according to claim 16 wherein the processing function is operable to locate within the stored time samples a time T2 corresponding to the start of a second transmission of a training symbol.

18. A terminal according to claim 17 wherein the first terminal further includes a processing function operable to apply a correction factor to the time samples to compensate for frequency offset.

19. A terminal according to claim 18 wherein the first terminal includes a processor operable to perform a FFT operation on the time samples to produce a composite vector C of phasors.

20. A terminal according to claim 19 which further includes a processor operable to perform a LAN system operation using the estimated distance result.

21. A terminal according to claim 20 which comprises a LAN Access Point and the terminal includes a processor operable to participate in an assisted handoff procedure of a second terminal, the second terminal being a Remote Unit (RU) of the LAN.

22. A terminal according to claim 20 operable to determine, with the assistance of other Access Point terminals, using the estimated distance result the location of a Remote Unit terminal.

23. A method of estimating the distance between a first wireless communication terminal and a second wireless communication terminal including: at the second transmitting terminal:
  (i) generating an OFDM training symbol comprising phasors in the frequency domain;
  (ii) processing the generated signal by applying an inverse FFT operation to the phasors of the generated signal in the frequency domain to generate I and Q components of a complex signal in the time domain;
  (iii) combining the I and Q components to produce a transmission signal; and
  (iv) transmitting the transmission signal; and at the first receiving terminal:
  (v) receiving a received signal comprising a composite multipath derivative of the transmission signal transmitted by the second terminal; and (vi) processing the received signal including performing a demodulation operation to produce a demodulated signal;
  (vii) resolving the demodulated signal into a plurality of components corresponding to different path length components included in the received signal by producing a composite vector C of phasors from the demodulated signal, constructing a special set $\{Ck\}$ of vectors, wherein each component of the set $\{Ck\}$ corresponds to a different particular path length travelled by the received signal, and carrying out a mathematical functional operation to find the absolute value of the inner product $|<C,Ck>|$ of the composite vector C with each of the components of the constructed set $\{Ck\}$;
  (viii) identifying which of the resolved components corresponds to a shortest path length; and
  (ix) for the identified component, computing a time of travel from the second terminal to the first terminal.

24. A method according to claim 23 wherein the second terminal is a standard unmodified RU terminal.

25. A method according to claim 24 wherein the method operates using a one-way communication path from the second terminal to the first terminal without loopback.

* * * * *